(12) United States Patent
Kim et al.

(10) Patent No.: US 12,138,215 B2
(45) Date of Patent: Nov. 12, 2024

(54) RECONFIGURABLE MOTION ASSISTANCE APPARATUS

(71) Applicant: SAMSUNG ELECTRONICS CO., LTD., Suwon-si (KR)

(72) Inventors: Sungcheol Kim, Suwon-si (KR); Keumjong Bae, Suwon-si (KR); Jaeseung Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/320,434

(22) Filed: May 19, 2023

(65) Prior Publication Data
US 2023/0285219 A1    Sep. 14, 2023

Related U.S. Application Data

(63) Continuation of application No. PCT/KR2022/015337, filed on Oct. 12, 2022.

(30) Foreign Application Priority Data

| Oct. 12, 2021 | (KR) | .......................... 10-2021-0134780 |
| Jul. 26, 2022 | (KR) | .......................... 10-2022-0092550 |
| Oct. 11, 2022 | (KR) | .......................... 10-2022-0129738 |

(51) Int. Cl.
*A61H 3/00* (2006.01)
*A61H 1/02* (2006.01)

(52) U.S. Cl.
CPC ............. *A61H 3/00* (2013.01); *A61H 1/0244* (2013.01); *A61H 2003/007* (2013.01);
(Continued)

(58) Field of Classification Search
CPC .. A61H 3/00; A61H 1/0244; A61H 2003/007; A61H 2201/1215;
(Continued)

(56) References Cited

U.S. PATENT DOCUMENTS

| 8,652,075 B2 | 2/2014 | Takahashi et al. |
| 10,039,687 B2 | 8/2018 | Choi et al. |

(Continued)

FOREIGN PATENT DOCUMENTS

| EP | 3827801 A1 | 6/2021 |
| JP | 2020531066 A | 11/2020 |

(Continued)

OTHER PUBLICATIONS

International Search Report for PCT/KR2022/015337 mailed Jan. 17, 2023, 3 pages.
(Continued)

*Primary Examiner* — Timothy A Stanis
(74) *Attorney, Agent, or Firm* — NIXON & VANDERHYE P.C.

(57) ABSTRACT

A wearable and reconfigurable motion assistance apparatus may include: a waist belt to be worn around a waist part of a user, a thigh belt to be worn around a thigh part of the user, an actuator connected to the waist belt and configured to generate power, a main frame including an upper frame connected to the actuator and a lower frame connected to the upper frame and configured to transmit the power to the thigh belt, an upper cover provided to be detachable from the upper frame, and a lower cover provided to be detachable from the lower frame.

20 Claims, 11 Drawing Sheets

(52) U.S. Cl.
CPC ............... *A61H 2201/1215* (2013.01); *A61H 2201/1463* (2013.01); *A61H 2201/163* (2013.01); *A61H 2201/1642* (2013.01); *A61H 2201/165* (2013.01); *A61H 2201/1676* (2013.01)

(58) Field of Classification Search
CPC ...... A61H 2201/1463; A61H 2201/163; A61H 2201/1642; A61H 2201/165; A61H 2201/1676
See application file for complete search history.

(56) References Cited

U.S. PATENT DOCUMENTS

| | | | |
|---|---|---|---|
| 10,136,857 | B2 | 11/2018 | Nuovo et al. |
| 10,265,196 | B2 | 4/2019 | Ha et al. |
| 10,478,368 | B2 | 11/2019 | Lee et al. |
| 2007/0270731 | A1 | 11/2007 | Sloot |
| 2009/0306554 | A1 | 12/2009 | Yasuie |
| 2010/0204804 | A1* | 8/2010 | Garrec ................. A61H 1/0277 623/24 |
| 2012/0316476 | A1 | 12/2012 | Shimizu et al. |
| 2014/0024978 | A1 | 1/2014 | Killian et al. |
| 2014/0276265 | A1* | 9/2014 | Caires ................. A61H 1/0255 601/34 |
| 2015/0336265 | A1* | 11/2015 | Choi ........................ A61H 3/00 414/4 |
| 2016/0015532 | A1* | 1/2016 | Lee ........................ A61H 1/024 623/24 |
| 2016/0016307 | A1* | 1/2016 | Choi ........................ A61H 3/00 74/423 |
| 2016/0081870 | A1* | 3/2016 | Lee ......................... A61F 2/605 623/27 |
| 2016/0128890 | A1* | 5/2016 | LaChappelle ............ A61H 3/00 623/30 |
| 2017/0086990 | A1* | 3/2017 | Choi ........................ A61F 2/605 |
| 2019/0046078 | A1 | 2/2019 | Lim et al. |
| 2019/0254909 | A1* | 8/2019 | Lee ........................ B25J 9/0006 |
| 2019/0262211 | A1 | 8/2019 | Son et al. |
| 2020/0016021 | A1* | 1/2020 | Lee ........................ A61H 1/0244 |
| 2021/0053208 | A1* | 2/2021 | Paine ................... A61H 1/0244 |
| 2021/0220207 | A1* | 7/2021 | Kim ...................... B25J 9/0006 |
| 2021/0311689 | A1 | 10/2021 | Kwon |

FOREIGN PATENT DOCUMENTS

| | | |
|---|---|---|
| KR | 20040043307 A | 5/2004 |
| KR | 102250260 B1 | 1/2016 |
| KR | 20160009854 A | 1/2016 |
| KR | 101948115 B1 | 2/2019 |
| KR | 20190021665 A | 3/2019 |
| KR | 102379465 B1 | 3/2022 |

OTHER PUBLICATIONS

Korean Notice of Office dated Nov. 29, 2023 for KR Application No. 10-2022-0129738.

* cited by examiner

RECONFIGURABLE MOTION ASSISTANCE APPARATUS

CROSS-REFERENCE TO RELATED APPLICATIONS

This application is a continuation application of International Application No. PCT/KR2022/015337 designating the United States, filed on Oct. 12, 2022, in the Korean Intellectual Property Receiving Office and claiming priority to Korean Patent Application No. 10-2021-0134780, filed on Oct. 12, 2021, Korean Patent Application No. 10-2022-0092550, filed on Jul. 26, 2022, and Korean Patent Application No. 10-2022-0129738, filed on Oct. 11, 2022, in the Korean Intellectual Property Office, the disclosures of which are all hereby incorporated by reference herein in their entireties.

BACKGROUND

1. Field

Certain example embodiments relate to a reconfigurable motion assistance apparatus.

2. Description of Related Art

In a rapidly aging society, a growing number of people experience inconvenience and pain from joint problems and interest in an assistance device for assisting elderly users and patients in walking with ease has increased. A motion assistance apparatus may also be worn to increase muscular strength of a certain body part(s), for a wide range of people.

SUMMARY

According to an example embodiment, a reconfigurable motion assistance apparatus may include a waist belt to be worn around a waist part of a user, a thigh belt to be worn around a thigh part of the user, an actuator connected, directly or indirectly, to the waist belt and configured to generate power, a main frame including an upper frame connected, directly or indirectly, to the actuator and a lower frame connected, directly or indirectly, to the upper frame and configured to transmit the power to at least the thigh belt, an upper cover provided to be detachable from the upper frame, and a lower cover provided to be detachable from the lower frame.

An example reconfigurable motion assistance apparatus may include a waist belt to be worn around a waist part of a user, a thigh belt to be worn around a thigh part of the user, an actuator connected, directly or indirectly, to the waist belt and configured to generate power, a main frame including an upper frame connected, directly or indirectly, to the actuator and a lower frame connected, directly or indirectly, to the upper frame and configured to transmit the power to the thigh belt, and a connector including a connector body connected, directly or indirectly, to the thigh belt and a pair of connector wings formed to extend from the connector body.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
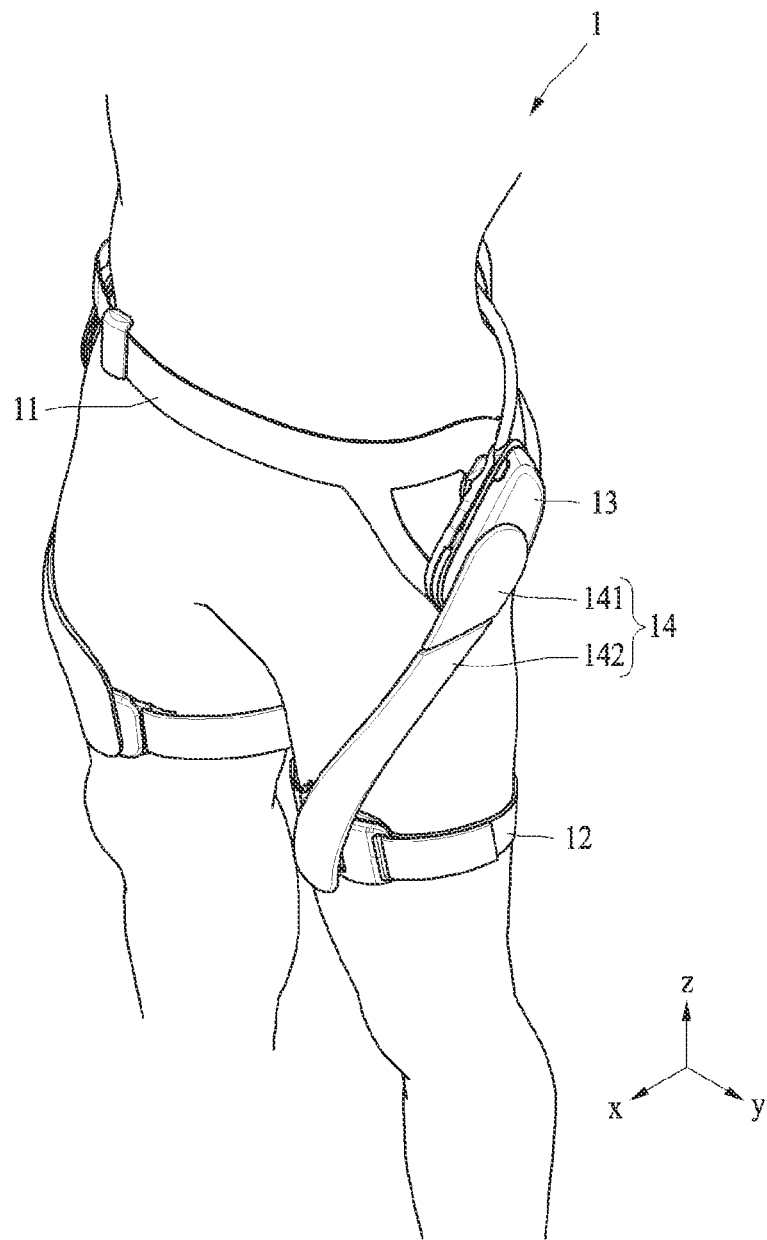
FIG. 1 is a perspective view of a user wearing a motion assistance apparatus according to an example embodiment.

The following detailed structural or functional description is provided as an example only and various alterations and modifications may be made to the examples. Here, embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component.

It should be noted that if it is described that one component is "connected", "coupled", or "joined" to another component, at least a third component(s) may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The same name may be used to describe an element included in the embodiments described above and an element having a common function. Unless disclosed to the contrary, the configuration disclosed in any an embodiment may be applied to other embodiments, and the specific description of the repeated configuration will be omitted.

Unless otherwise defined, all terms used herein including technical or scientific terms have the same meaning as commonly understood by one of ordinary skill in the art to which an example belongs. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like constituent elements and a repeated description related thereto will be omitted.

Figure 2:
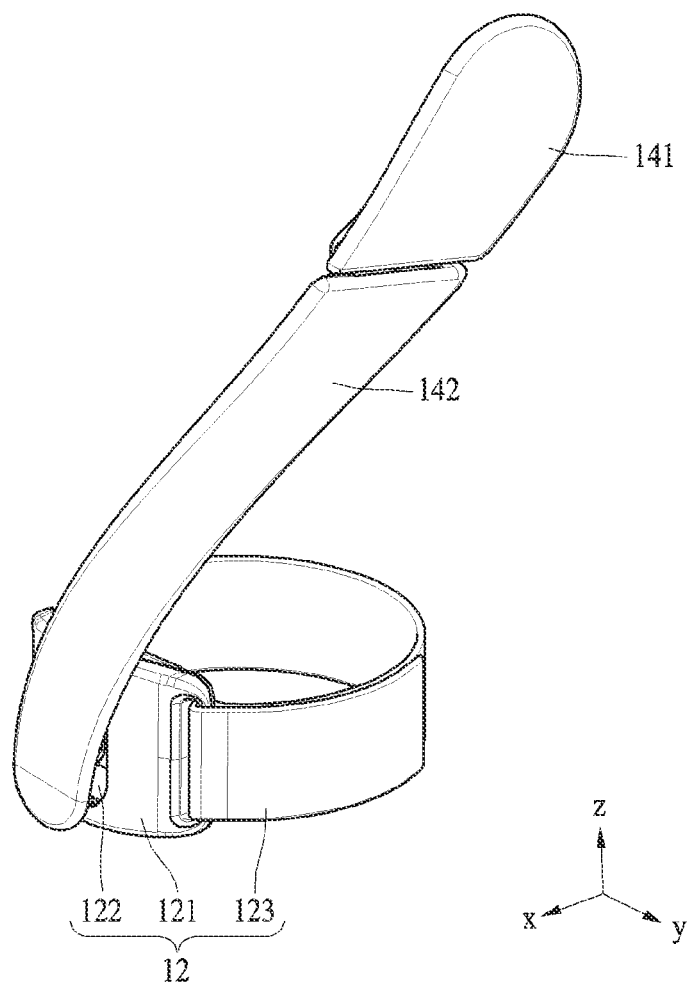
FIG. 2 is a perspective view illustrating an upper cover and a lower cover combined with a main frame, and a thigh belt according to an example embodiment.
Figure 3:
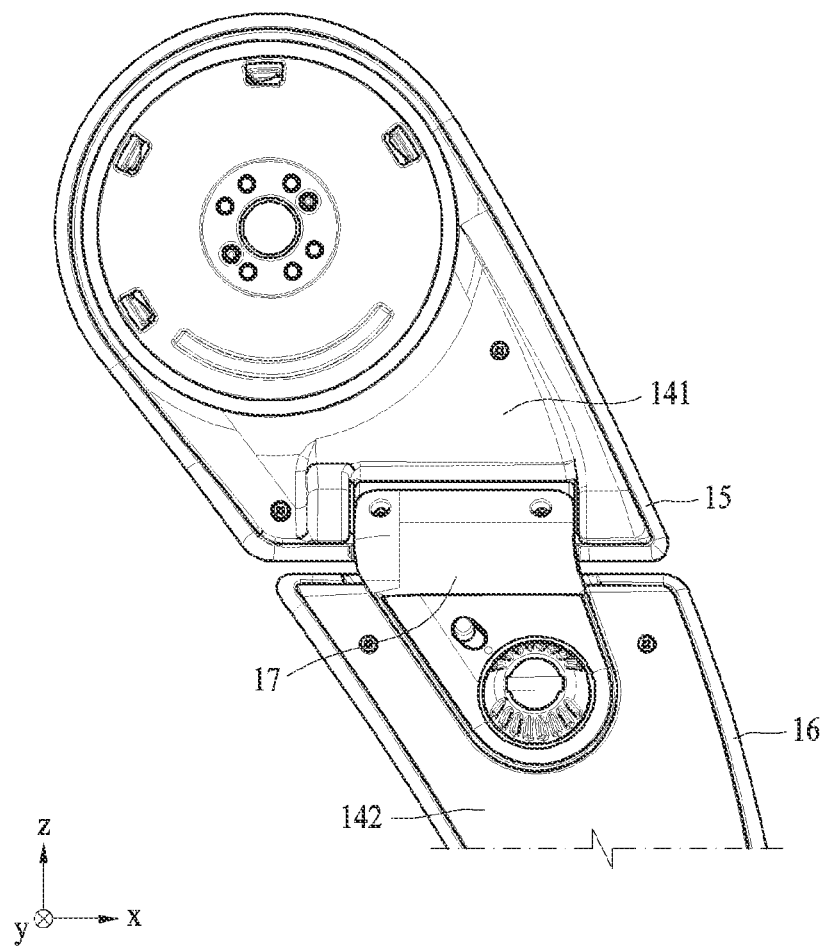
FIG. 3 is a perspective view of a main frame, an upper cover, a lower cover, and a link according to an example embodiment.

FIG. 1 is a perspective view illustrating a user wearing a motion assistance apparatus according to an embodiment, FIG. 2 is a perspective view illustrating an upper cover and a lower cover combined with a main frame, and a thigh belt according to an embodiment, and FIG. 3 is a perspective view of a main frame, an upper cover, a lower cover, and a link according to an embodiment.

Referring to FIGS. 1 to 3, a motion assistance apparatus 1 according to an embodiment may be worn by a user and assist a motion of the user. The user may be a human, an animal, or a robot, but examples are not limited thereto. The motion assistance apparatus 1 may assist a motion of some joints of an upper or lower body of the user. For example, the motion assistance apparatus 1 may assist the motion of the lower body of the user by assisting at least one of a hip joint, a knee joint, and an ankle joint of the user.

In an embodiment, the motion assistance apparatus 1 may be reconfigurable considering the user's usage environment. The user may replace individual components constituting the motion assistance apparatus 1 with other components having a same shape, according to a type of motion, preferred color, and shape of clothes of the user, and so on. The motion assistance apparatus 1 may be reconfigured to suit a purpose of the user. Usability of the motion assistance apparatus 1 may be increased. For example, referring to FIG. 4, an upper cover 15 and a lower cover 16 may be detachably connected to an upper frame 141 and a lower frame 142. The motion assistance apparatus 1 may include a waist belt 11, a thigh belt 12, an actuator 13, a main frame 14, the upper cover 15, and the lower cover 16.

In an embodiment, the waist belt 11 and the thigh belt 12 may be arranged opposite to each other based on one body part of the user and may each be worn around a proximal part and a distal part. For example, the waist belt 11 may support a waist and/or a pelvis of the user and the thigh belt 12 may support a thigh, a knee, a calf, and/or a foot of the user. The waist belt 11 may include a detachable belt for supporting the waist of the user all around. The thigh belt 12 may include a detachable belt for supporting the thigh of the user all around.

In an embodiment, the waist belt 11 and the thigh belt 12 may move relative to each other on a sagittal plane. For example, when the user wearing the motion assistance apparatus 1 flexes or extends the hip joint of the user, the thigh belt 12 may rotate relative to the waist belt 11 on the sagittal plane.

In an embodiment, the waist belt 11 and the thigh belt 12 may move relative to each other on a frontal plane. For example, when the user wearing the motion assistance apparatus 1 adducts or abducts the hip joint of the user, the thigh belt 12 may rotate relative to the waist belt 11 on the frontal plane.

In an embodiment, the main frame 14 and the thigh belt 12 may move relative to each other on a transverse plane. For example, when the user wearing the motion assistance apparatus 1 rotates the thigh of the user, the thigh belt 12, which is in close contact with the thigh of the user, may rotate together with the thigh of the user. The thigh belt 12 may rotate relative to the main frame 14. In this structure, wearability of the motion assistance apparatus 1 of the user may increase. The thigh belt 12 may include a slider housing 121, a slider 122, and a strap 123.

In an embodiment, when the user wearing the motion assistance apparatus 1 flexes or extends the hip joint of the user, the slider housing 121 may rotate relative to the main frame 14 on the sagittal plane. The slider housing 121 may include a sliding space in which the slider 122 may move. For example, the sliding space may be formed in a y-axis direction or a z-axis direction.

In an embodiment, the slider 122 may be provided to be slidable within the slider housing 121. For example, the slider 122 may move along a rail provided within the slider housing 121. The thigh belt 12 may move relative to the main frame 14.

In an embodiment, the strap 123 may surround a thigh part of the user. The strap 123 may include a detachable belt surrounding the thigh part of the user. A material of the strap 123 may include rubber, leather, cotton, or polyester. However, the material of the strap 123 is not necessarily limited thereto.

In an embodiment, the strap 123 may be individually commercialized according to various uses. The user may replace the strap 123 depending on use. For example, the user may connect the strap 123 of a different color, a different material, or a different function to the slider housing 121. For example, a sensor (not shown) may be attached to the slider housing 121 or the strap 123.

In an embodiment, the sensor may include a wireless pressure sensor, which may measure energy generated during a motion of the user and use measured data for walking or the motion of the user. The sensor may include a wireless inertial measurement unit (IMU) sensor, which may measure an angular velocity of the hip joint of the user and improve a motion monitoring function. The sensor may include a sensor which may turn on light-emitting diode (LED) light during a motion at night or provide vibration feedback to the user during the motion of the user. The material or a shape of the strap 123 or a type of the sensor attached to the strap 123 may vary depending on the type of motion of the user, surrounding environment, and the like. The sensor may wirelessly connect to an electronic device and transmit and receive data to and from the electronic device. The sensor may be controlled through an application installed on the electronic device.

In an embodiment, the actuator 13 may be connected to the waist belt 11 and generate power. The actuator 13 may include, for example, a motor and a speed reducer. The motor may include at least one of a brush motor, a brushless motor, and a stepping motor. The motor may include at least one of an induction motor and a synchronous motor. The speed reducer may include, for example, a gear train.

In an embodiment, the main frame 14 may transmit power generated by the actuator 13 to the thigh belt 12. For example, the main frame 14 may assist a motion of the hip joint of the user. When an output terminal of the actuator 13 rotates in one direction, the main frame 14 may receive the power from the actuator 13 and assist a flexion of the hip joint of the user. When the output terminal of the actuator 13 rotates in an opposite direction to the one direction, the main frame 14 may receive the power from the actuator 13 and assist extension of the hip joint of the user. For example, the main frame 14 may be formed of a light and high-strength material, such as carbon fiber. The main frame 14 may include the upper frame 141 and the lower frame 142.

In an embodiment, the upper frame 141 may be provided to be detachably attached to the actuator 13. For example, the upper frame 141 may be combined with an outer surface of the actuator 13. The upper frame 141 may be separated from the actuator 13 without disassembling the actuator 13.

In an embodiment, the lower frame 142 may be rotatably connected to the upper frame 141 and be connected to the thigh belt 12. The lower frame 142 may have a shape which covers a part of the thigh part of the user.

In an embodiment, the upper cover 15 may be detachably connected to the upper frame 141. When the upper frame 141 is formed of carbon fiber, the upper frame 141 may be manufactured in a color different from the preferred color of the user, because carbon fiber has a dark color and an inside of the carbon fiber is impenetrable by light. The upper cover 15 may be detachably connected to the upper frame 141 so that an appearance of the upper frame 141 is not exposed to an outside. When the upper cover 15 is damaged or worn out, just the upper cover 15 may be separated from the upper frame 141 and be replaced. A maintenance cost of the motion assistance apparatus 1 may decrease.

In an embodiment, the user may replace the upper cover 15 as needed. A plurality of replaceable upper covers may have a same shape. Upper covers may be individually commercialized according to various uses. For example, the user may connect an upper cover of various colors or patterns to the upper frame 141 depending on colors of the clothes of the user. For example, the user may connect an upper cover of a different material to the upper frame 141 depending on the type of motion of the user. For example, the user may connect, to the upper frame 141, an upper cover including a component with an additional function, such as a speed sensor or a motion sensor. A sensor (not shown) may wirelessly connect to an electronic device and transmit and receive data to and from the electronic device. The sensor may be controlled through an application installed on the electronic device.

In an embodiment, the lower cover 16 may be detachably connected to the lower frame 142. The user may replace the lower cover 16 as needed. A plurality of replaceable lower covers may have a same shape. The plurality of lower covers may be individually commercialized according to various uses. In addition to those described above, each feature of the lower cover 16 may be identical or similar to those of the upper cover 15.

The upper frame 141 and the lower frame 142 according to an embodiment may be connected and yet spaced apart from each other. For example, a link 17 may be provided between at least the upper frame 141 and the lower frame 142, and the upper frame 141 and the lower frame 142 may be connected to rotate relative to one another.

In an embodiment, there may be a distance between the upper frame 141 and the lower frame 142. The upper cover 15 may not touch the lower cover 16. In this structure, damage to the upper cover 15 or the lower cover 16 due to friction may be reduced. For example, when the upper cover 15 is combined with or separated from the upper frame 141, the lower cover 16 may be noninterfering. The upper cover 15 and the lower cover 16 may be easily detachable from a main frame.

In an embodiment, one frame may rotate relative to the other frame. For example, the lower frame 142, with respect to the upper frame 141, may rotate in a direction of adducting the hip joint of the user. When the user moves the thigh, only the lower frame 142 may rotate instead of the main frame 14 entirely moving. A movable range of the hip joint of the user on the frontal plane may increase. The thigh may flexibly move. The wearability of the motion assistance apparatus 1 may increase.

In an embodiment, when the user falls while walking or walks on a steep slope, the user may suddenly move the thigh of the user. The lower frame 142 may rotate together with the thigh of the user with respect to the upper frame 141, and thus, instantaneous force applied to the main frame 14 may disperse. The main frame 14 may be inflexible. The shape of the main frame 14 may not be deformed.

In an embodiment, one end of the link 17 may be connected to the lower frame 142. For example, the one end of the link 17 may be screw-connected to the lower frame 142 or may be connected to the lower frame 142 by using an attractive force caused by a magnet. However, a connection structure between the one end of the link 17 and the lower frame 142 is not necessarily limited thereto.

The other end of the link 17 may be connected to a rotating shaft supported by the upper frame 141. The link 17 may rotate based on the rotating shaft as a rotation axis. "Based on" as used herein covers based at least on. The link 17 is described as being connected to the lower frame 142 and both ends of the rotating shaft are described as being connected to the upper frame 141, but are not necessarily limited thereto. For example, in an embodiment, one end of the link 17 may be connected to the upper frame 141 and both ends of the rotating shaft may be connected to the lower frame 142.

In an embodiment, the rotating shaft may connect the upper frame 141 with the link 17. In a state in which both end portions of the rotating shaft are accommodated in grooves formed in the upper frame 141, the rotating shaft may rotate with respect to the upper frame 141. The link 17 may be connected to the rotating shaft and may rotate integrally with the rotating shaft. The lower frame 142 may rotate with respect to the upper frame 141. The rotating shaft is described as rotating but is not necessarily limited thereto. For example, in an embodiment, in a state in which the rotating shaft is fixed to the upper frame 141, only the link 17 may rotate.

Figure 4:
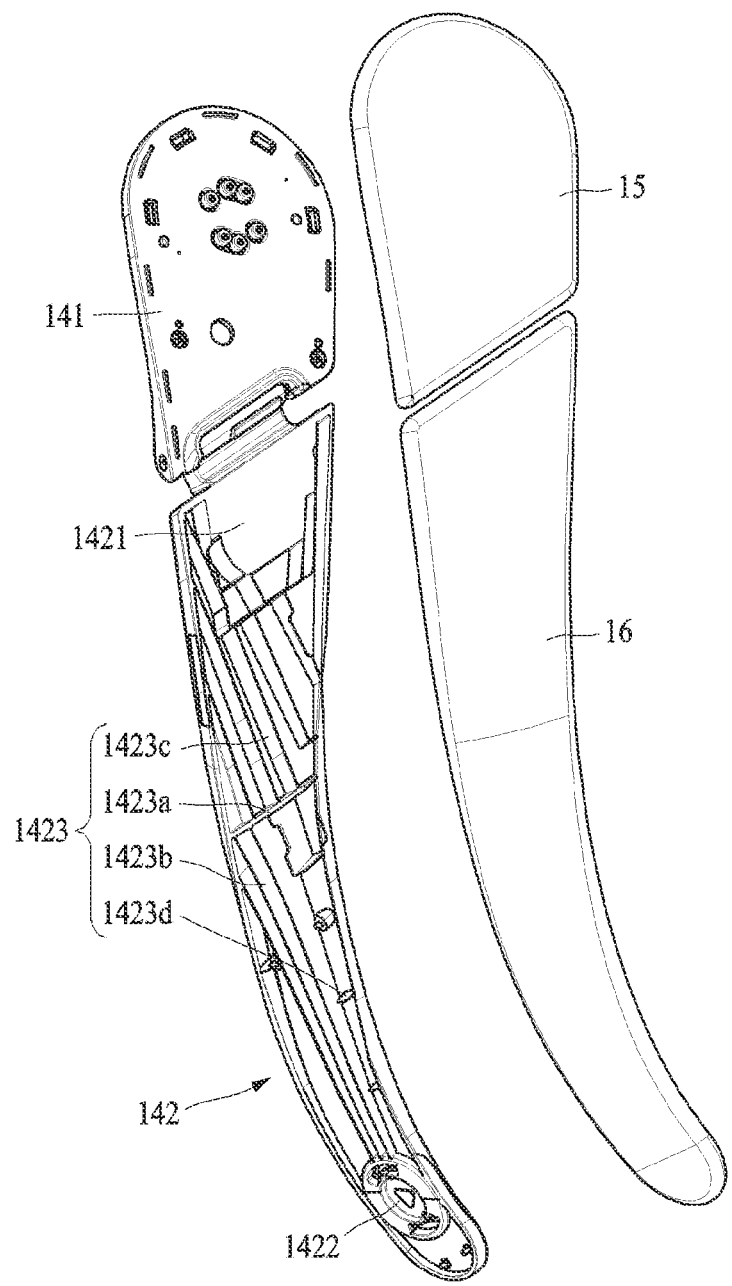
FIG. 4 is a perspective view of an upper frame, a lower frame, an upper cover, and a lower cover according to an example embodiment.

FIG. 4 is a perspective view of an upper frame, a lower frame, an upper cover, and a lower cover according to an embodiment.

Referring to FIG. 4, the lower frame 142 according to an embodiment may include a lower frame body 1421, a holder 1422, and a frame rib 1423. The lower frame body 1421 may be detachably connected to the upper frame 141. A lower cover 16 may be detachably connected to the lower frame body 1421; for example, the lower cover 16 may be screw-connected to the lower frame body 1421. The holder 1422 may be detachably connected to a thigh belt.

In an embodiment, the frame rib 1423 may be formed to protrude from the lower frame body 1421 and support the lower cover 16. The lower frame 142 and the lower cover 16 may have a longer, twisted shape than the upper frame 141 and the upper cover 15 in order to cover a thigh of a user. The lower cover 16, which has low strength compared to the lower frame 142, may be deformed or damaged by an external force. The frame rib 1423 may support the lower cover 16, and the lower cover 16 may be stably combined with the lower frame 142. For example, after analyzing an area of the lower cover 16 that receives concentrated force through topology optimization design, a location of a formation of the frame rib 1423 may be determined to support the corresponding area. The frame rib 1423 may include a core rib 1423*a*, a lower rib 1423*b*, an upper rib 1423*c*, and a side rib 1423*d*.

In an embodiment, the core rib 1423*a* may be provided between the link 17 and the holder 1422. The core rib 1423*a* may be formed along a width direction of the lower frame body 1421. For example, the core rib 1423*a* may be formed near a center of the lower frame body 1421. The core rib 1423*a* may support an area near a center of the lower cover 16, with a biggest degree of twist.

In an embodiment, the lower rib 1423*b* may be formed to extend from the core rib 1423*a* to the holder 1422. The upper rib 1423*c* may be formed to extend from the core rib 1423*a* and be provided opposite to the lower rib 1423*b* with respect to the core rib 1423*a*. The lower rib 1423*b* and the upper rib 1423*c* may each be formed in a longitudinal direction of the lower frame body 1421. For example, the lower rib 1423*b* and the upper rib 1423*c* may each be provided in plurality.

In an embodiment, the lower rib 1423*b* and the upper rib 1423*c* may each form an inclination with the lower frame body 1421, and directions of the inclination may be opposite to each other. In this structure, the lower rib 1423*b* and the upper rib 1423*c* may support the lower cover 16 having a twisted shape in a balanced way.

In an embodiment, the side rib 1423*d* may be formed to extend from an edge of the lower frame body 1421. For example, the side rib 1423*d* may be connected to the lower rib 1423*b* and the upper rib 1423*c*. A size of load supportable by the lower rib 1423*b* and the upper rib 1423*c* connected to the side rib 1423*d* may increase. The lower cover 16 may be stably supported by the lower rib 1423*b* and the upper rib 1423*c*.

Figure 5:
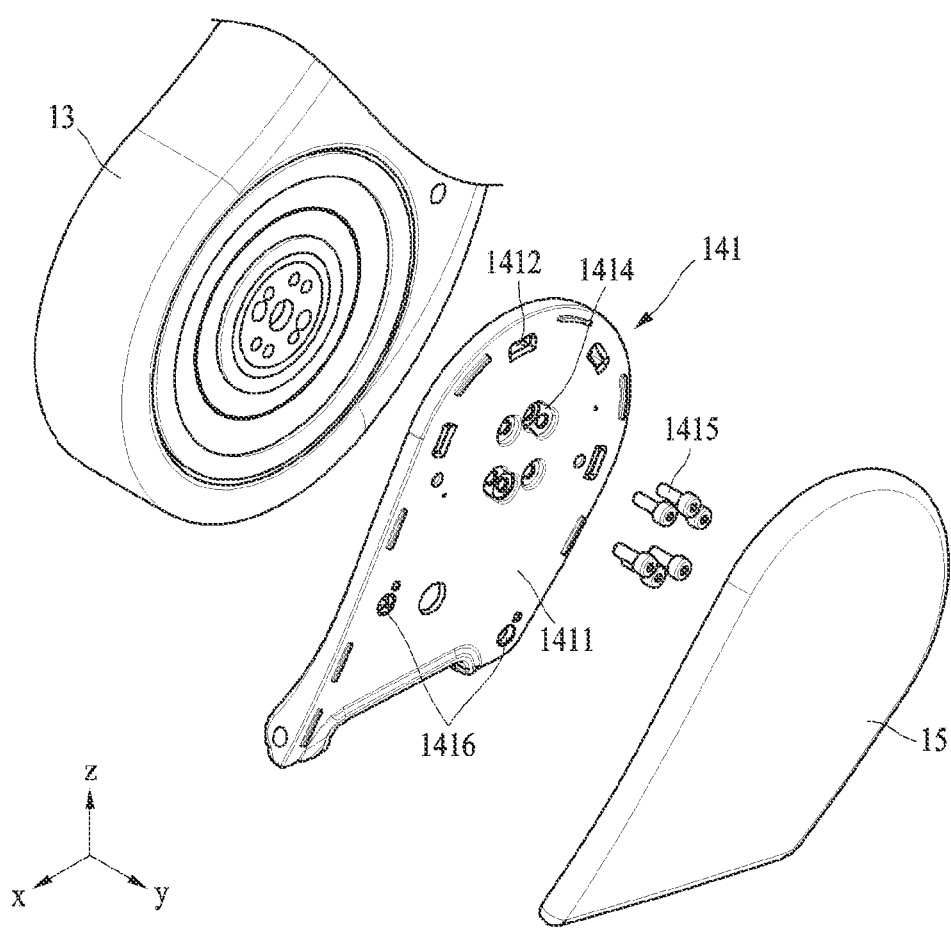
FIG. 5 is a front perspective view of an actuator, an upper frame, and an upper cover according to an example embodiment.
Figure 6:
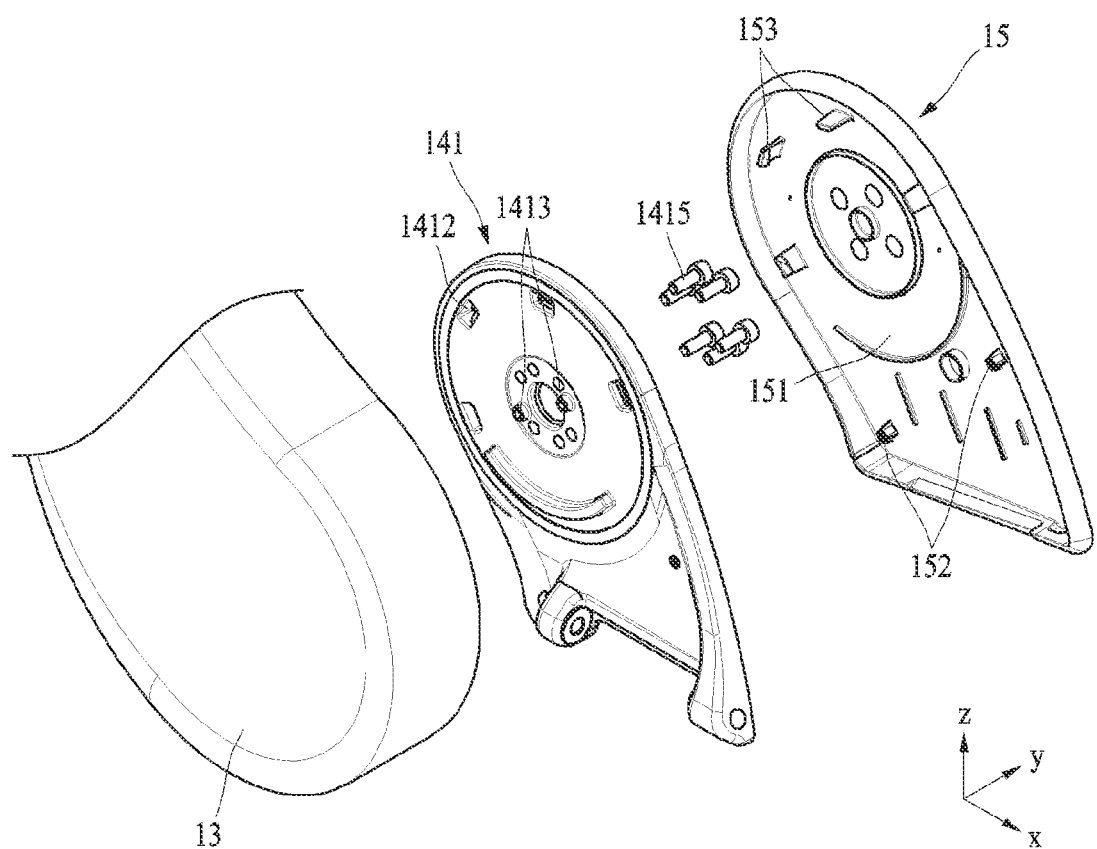
FIG. 6 is a rear perspective view of an actuator, an upper frame, and an upper cover according to an example embodiment.

FIG. 5 is a front perspective view of an actuator, an upper frame, and an upper cover according to an embodiment, and FIG. 6 is a rear perspective view of an actuator, an upper frame, and an upper cover according to an embodiment.

Referring to FIGS. 5 and 6, the upper frame 141 may be detachably connected to each of the actuator 13 and the upper cover 15, according to an embodiment. The upper frame 141 may include an upper frame body 1411, hook holes 1412, and aligning protrusions 1413.

In an embodiment, the upper frame body 1411 may be rotatably connected to a lower frame. In the upper frame body 1411, motor screw holes 1414, into which motor screws 1415 connected to the actuator 13 are inserted, and upper screw holes 1416, into which upper screws connected to the upper cover 15 are inserted, may be formed. While a user moves the body of the user while wearing a motion assistance apparatus, it may be uneasy to separate the upper frame 141 from the actuator 13 or the upper cover 15.

In an embodiment, the hook holes 1412 may be formed through the upper frame body 1411. A plurality of hook holes 1412 may be formed. The plurality of hook holes 1412 may be provided to be spaced apart from one another in a circumferential direction of a rotation axis of a main frame with respect to a waist belt.

In an embodiment, the aligning protrusions 1413 may be formed to protrude from the upper frame body 1411 and be inserted into the actuator 13. A plurality of aligning protrusions 1413 may be spaced apart from one another in a circumferential direction of a rotation axis of a main frame with respect to a waist belt. The strength of a combination of the upper frame body 1411 and the actuator 13 may increase. While the plurality of aligning protrusions 1413 is inserted into the actuator 13, the upper frame 141 may cover an outer surface of the actuator 13. The upper frame body 1411 may be separated from the actuator 13 without disassembling the actuator 13.

In an embodiment, the upper cover 15 may include an upper cover body 151 and a plurality of hooks 153. The upper cover body 151 may cover the upper frame body 1411. In the upper cover 15, upper screw grooves 152 protruding from the upper cover body 151 and having grooves capable of accommodating upper screws therein may be provided. Upper screws may be accommodated in the upper screw grooves 152 and may not penetrate the upper cover body 151. An appearance of the upper cover 15 may be undamaged by upper screws.

In an embodiment, the plurality of hooks 153 may be formed to protrude from the upper cover body 151 and be inserted into the hook holes 1412. In this structure, the strength of a combination of the upper frame 141 and the upper cover 15 may increase. The user may remove upper screws from the upper screw grooves 152, separate the plurality of hooks 153 from the hook holes 1412, and then separate the upper cover 15 from the upper frame 141.

Figure 7:
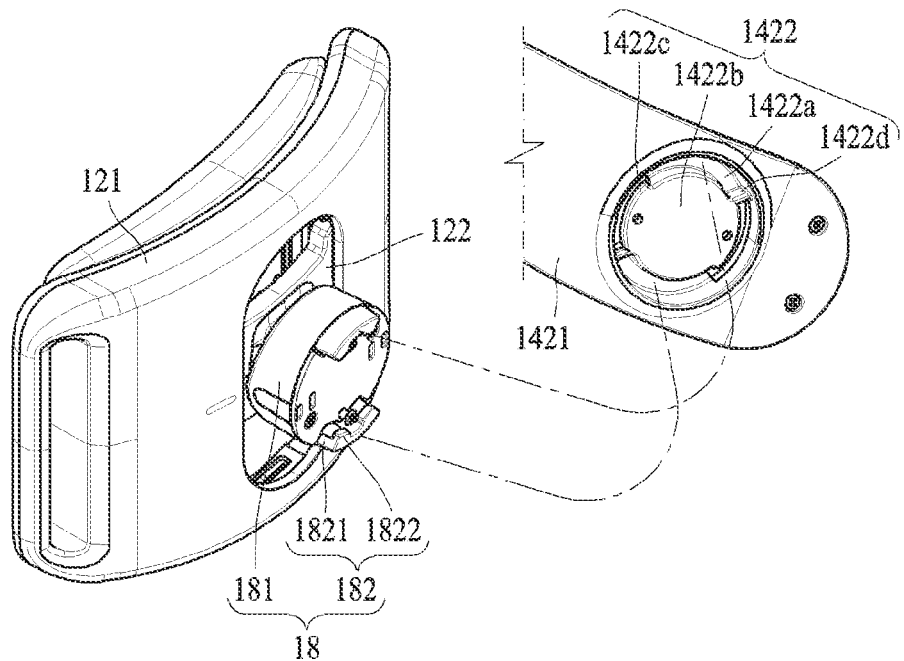
FIG. 7 is a perspective view of a slider housing, a connector, and a holder according to an example embodiment.
Figure 8:
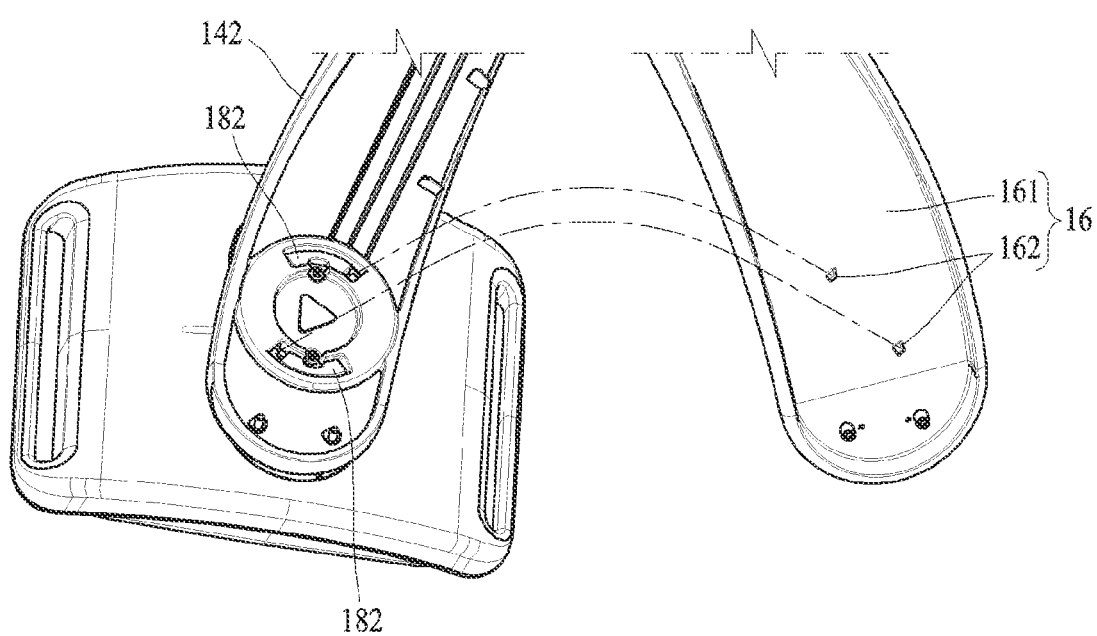
FIG. 8 is a perspective view of a slider housing, a lower frame, and a lower cover according to an example embodiment.

FIG. 7 is a perspective view of a slider housing, a connector, and a holder according to an embodiment and FIG. 8 is a perspective view of a slider housing, a lower frame, and a lower cover according to an embodiment.

Referring to FIGS. 7 and 8, the lower frame 142 may be detachably connected to each of a thigh belt and the lower cover 16, according to an embodiment. A connector 18 may be provided between a thigh belt and the lower frame 142.

In an embodiment, the connector 18 may connect a thigh belt of a user and the lower frame 142. The connector 18 may be provided to be detachable from the holder 1422 while being connected to the slider 122. With the connector 18 connected to the lower frame 142, the slider housing 121 may move relative to the connector 18. The thigh may flexibly move. The connector 18 may include a connector body 181 and connector wings 182.

In an embodiment, the connector body 181 may be connected to the slider 122. An edge of the connector body 181 may be circular. The connector wings 182 may be formed to protrude from a portion of the edge of the connector body 181 to the lower frame 142. The connector wings 182 may be provided as a pair facing each other and may be connected to the holder 1422. The connector wings 182 may include wing bodies 1821 formed to protrude from the connector body 181 and wing arms 1822 formed to protrude from the wing bodies 1821 to one other connector wing 182.

In an embodiment, the holder 1422 may be formed on the lower frame body 1421. The connector 18 may be connected to the holder 1422 by rotating relative to the holder 1422 in one direction and may be detached from the holder 1422 by rotating in an opposite direction. The holder 1422 may include connector guides 1422*a*, a holder body 1422*b*, a supporter 1422*c*, and support walls 1422*d*.

In an embodiment, the connector guides 1422a may be formed to be recessed in the lower frame body 1421. The connector wings 182 may be accommodated in the lower frame body 1421 and supported by the connector guides 1422a.

The connector guides 1422a may guide a rotation of the connector 18 relative to the holder 1422. When the connector body 181 rotates in one direction, the connector wings 182 may slide in one direction with respect to the connector guides 1422a. In order to guide a sliding of each of the connector wings 182, the connector guides 1422a may also be provided as a pair.

In an embodiment, the holder body 1422b faces the connector body 181 and may be provided between a pair of connector guides 1422a. The holder body 1422b may support the connector body 181.

In an embodiment, the supporter 1422c may be formed to extend from the holder body 1422b and may be provided as a pair to support each of a pair of connector wings 182. When the connector 18 rotates in one direction, the connector wings 182 may be supported by the connector guides 1422a to guide the rotation of the connector 18 and the wing arms 1822 may be supported by the supporter 1422c after a specific section to guide the rotation of the connector 18. The supporter 1422c may be disposed between at least the connector body 181 and the wing arms 1822.

In an embodiment, in order to limit a range in which the connector 18 rotates in one direction, the supporter 1422c, supporting any one of the connector wings 182, and the connector guides 1422a, guiding a sliding of the other connector wing 182, may be connected with the support walls 1422d. When the wing bodies 1821 are supported by the support walls 1422d and no longer rotate in one direction, the connector 18 may be in a state of being fully combined with the holder 1422. In this state, in order to increase the strength of the combination, the connector 18 and the holder 1422 may be screwed together.

In an embodiment, the connector wings 182 may be supported by the support walls 1422d while being spaced apart from the connector guides 1422a. Cover protrusions 162, protruding from a lower cover body 161 surrounding the lower frame 142, may be inserted into a space between at least the connector wings 182 and the connector guides 1422a. In this structure, a movement of the wing bodies 1821 between at least the support walls 1422d and the cover protrusions 162 may be restricted. A size of an external force applied to screws connected to the connector 18 due to a movement of the connector 18 may be reduced. Foreign substances may be prevented or reduced from penetrating into the space between at least the connector wings 182 and the connector guides 1422a.

Figure 9:
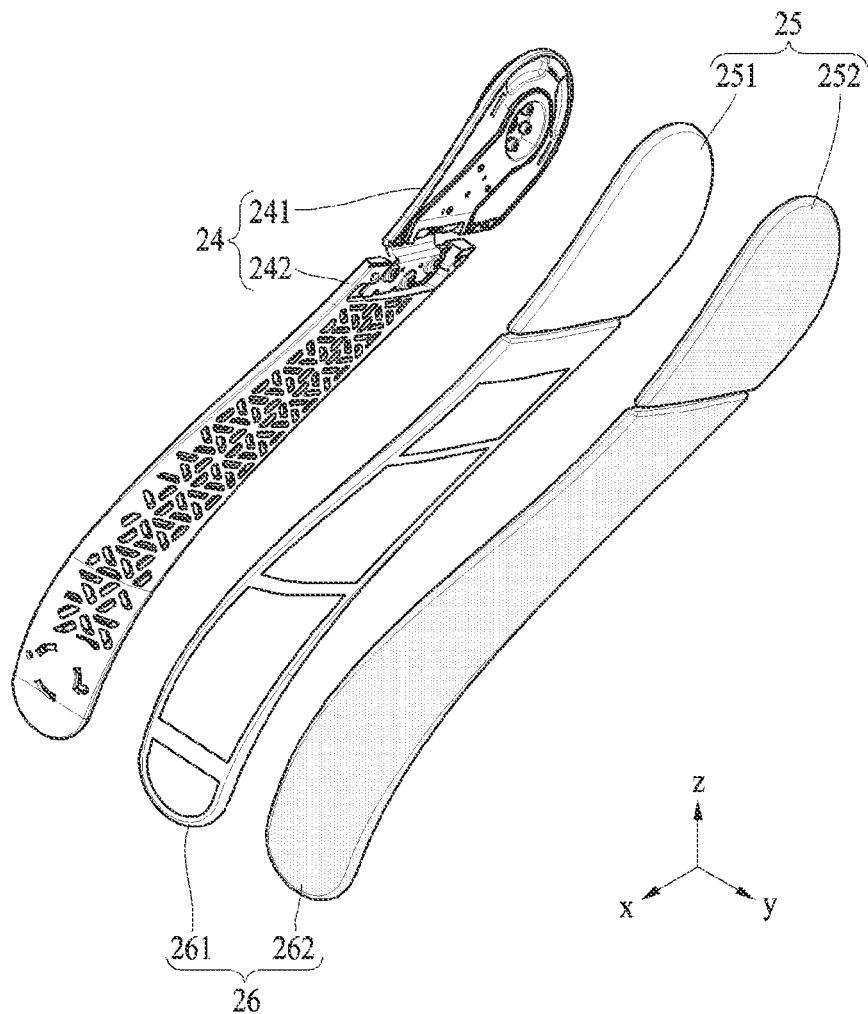
FIG. 9 is a perspective view of a main frame, an upper cover, and a lower cover according to an example embodiment.
Figure 10:
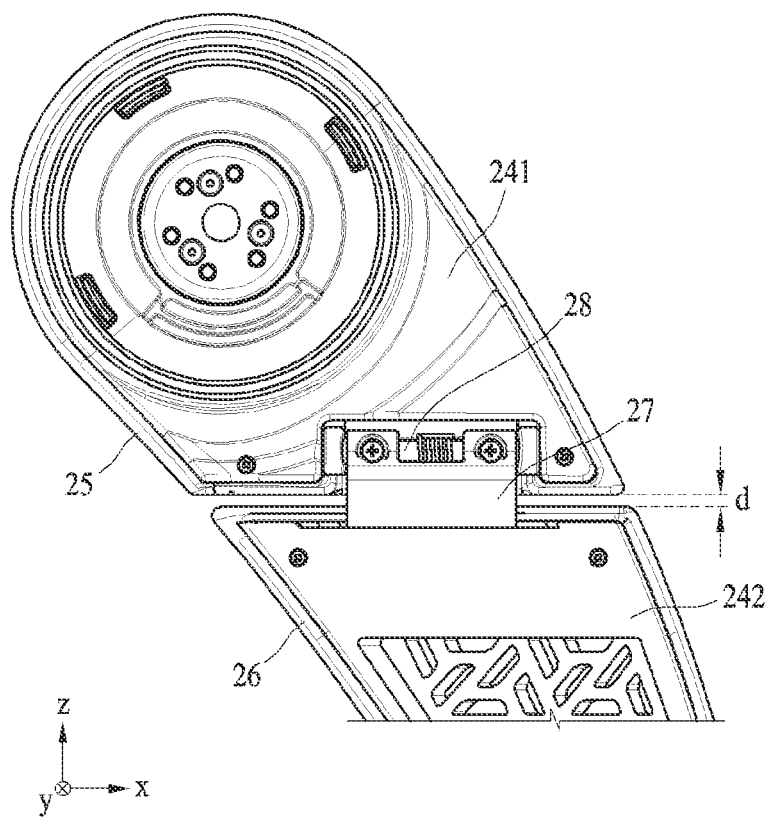
FIG. 10 is a right side view of a lower frame, an upper frame, a link, and a rotating shaft according to an example embodiment.

FIG. 9 is a perspective view of a main frame 24, an upper cover 25, and a lower cover 26 according to an embodiment, and FIG. 10 is a right side view of a lower frame, an upper frame, a link, and a rotating shaft according to an embodiment.

Referring to FIGS. 9 and 10, an upper cover 25 according to an embodiment may include an upper mold 251 and an upper layer 252. The upper mold 251 may be provided to be detachable from an upper frame 241. The upper mold 251 may support the upper layer 252. The upper mold 251 may be disposed between at least the upper frame 241 and the upper layer 252. The upper layer 252 may cover the upper mold 251. The upper layer 252 may be disposed on the outermost surface of the upper cover 25. The upper layer 252 may be separated from the upper mold 251.

In an embodiment, the upper layer 252 may be customized. For example, the upper layer 252 may be formed of various materials, such as fabric, rubber, or plastic. For example, the upper layer 252 may include various colors or patterns. For example, the upper layer 252 may include a component with an additional function, such as a sensor. The material of the upper layer 252, the shape of the upper layer 252, or the component with an additional function which is added to the upper layer 252 may vary depending on the type of motion of a user, surrounding environment, and the like.

In an embodiment, a lower cover 26 may be detachably connected to the lower frame 242. A user may replace the lower cover 26 as needed. A plurality of replaceable lower covers may have a same shape. The plurality of lower covers may be individually commercialized according to various uses. The lower cover 26 may include a lower mold 261 and a lower layer 262.

In an embodiment, the lower mold 261 may be provided to be detachable from the lower frame 242. The lower layer 262 may cover the lower mold 261. The lower layer 262 may be separated from the lower mold 261.

In an embodiment, to reduce a weight of the lower cover 26, an inner surface of an edge of the lower mold 261 may include at least one hole. Even when the lower mold 261 includes the at least one hole, a shape of an outer edge of the lower mold 261 may be maintained. A shape of the lower layer 262 covering the outer edge of the lower mold 261 may be maintained.

In an embodiment, the lower layer 262 may be customized. The lower layer 262 may have various materials or shapes or additionally include a component with an additional function. Materials, shapes, or the component with an additional function of the lower layer 262 may vary depending on the type of motion of a user, surrounding environment, and the like.

In addition to the descriptions provided above, characteristics of the lower cover 26, the lower mold 261, and the lower layer 262 may each be identical or similar to characteristics of the upper cover 25, the upper mold 251, and the upper layer 252.

In an embodiment, the upper frame 241 and the lower frame 242 may be connected and spaced apart from each other. For example, a link 27 may be provided between at least the upper frame 241 and the lower frame 242, and the upper frame 241 and the lower frame 242 may be connected to rotate relative to one another. Frame 24 is made up of at least upper frame 241 and lower frame 242.

In an embodiment, there may be a distance d between the upper frame 241 and the lower frame 242. The upper cover 25 may not touch the lower cover 26. The lower cover 26 may be easily separated from the lower frame 242. The upper cover 25 may be easily separated from the upper frame 241. An upper layer may not touch a lower layer. Damage from friction to the upper layer or the lower layer may decrease.

In an embodiment, one frame may rotate relative to the other frame. For example, the lower frame 242 may rotate in a direction of adducting a hip joint of a user, with respect to the upper frame 241. When the user moves a thigh of the user, only the lower frame 242 supporting the thigh of the user may rotate instead of an entire main frame connected to an actuator moving. A movable range of the hip joint of the user on the frontal plane may increase. A distal part of the user may flexibly move. Wearability of a motion assistance apparatus may increase.

In an embodiment, when a user falls while walking or walks on a steep slope, the user may suddenly move the thigh of the user. The lower frame 242 may rotate together with the thigh of the user with respect to the upper frame 241, and thus, instantaneous force applied to a main frame may disperse. The main frame may be inflexible in certain example embodiments. The shape of the main frame may not be deformed in certain example embodiments.

In an embodiment, one end of the link 27 may be connected to the lower frame 242. Another end of the link 27 may be connected to a rotating shaft 28. Another end of the link 27 may have a shape of surrounding the rotating shaft 28. For example, another end of the link 27 may have a hook shape. The link 27 is described as being connected to the lower frame 242 and both ends of the rotating shaft 28 are described as being connected to the upper frame 241, but are not necessarily limited thereto. For example, in an embodiment, the link 27 may be connected to the upper frame 241 and both ends of the rotating shaft 28 may be connected to the lower frame 242.

In an embodiment, the rotating shaft 28 may connect the upper frame 241 with the link 27. When both ends of the rotating shaft 28 are accommodated in grooves formed in the upper frame 241, the rotating shaft 28 may rotate around a line connecting both ends of the rotating shaft 28 as a rotation axis. The link 27 may be connected to the rotating shaft 28 and may rotate together with the rotating shaft 28. The lower frame 242 may rotate with respect to the upper frame 241. The rotating shaft 28 is described as rotating but is not necessarily limited thereto. For example, in an embodiment, the rotating shaft 28 may be fixed to the upper frame 241 and only the link 27 surrounding the rotating shaft 28 may rotate.

Figure 11:
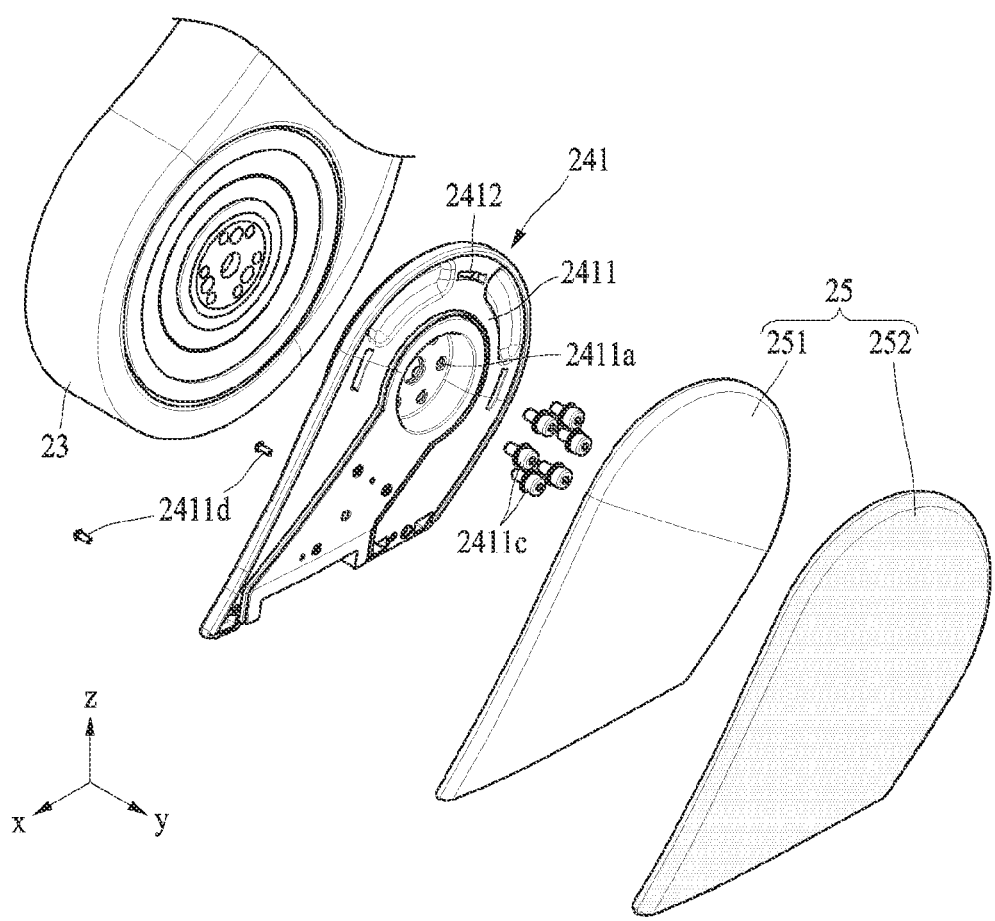
FIG. 11 is a front perspective view of an actuator, an upper frame, an upper mold, and an upper layer according to an example embodiment.
Figure 12:
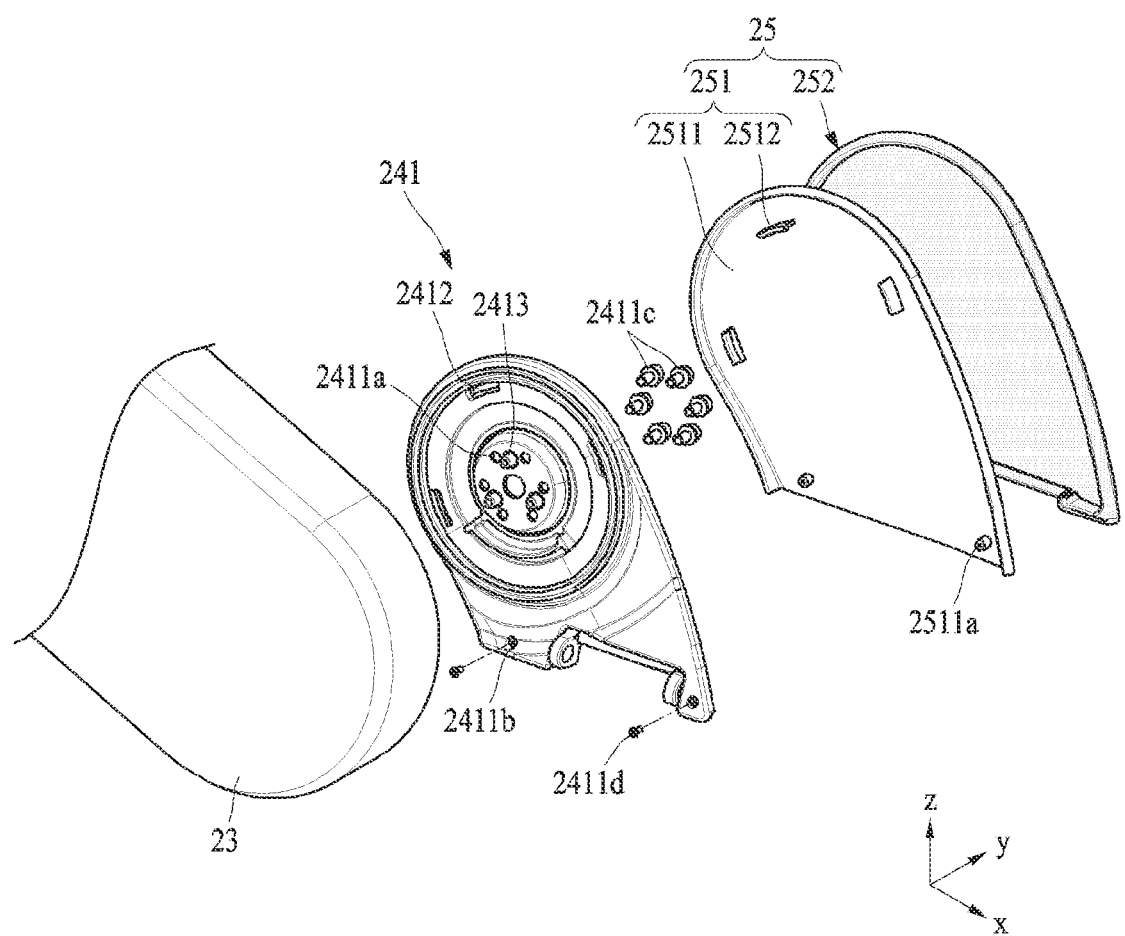
FIG. 12 is a rear perspective view of an actuator, an upper frame, an upper mold, and an upper layer according to an example embodiment.

FIG. 11 is a front perspective view of an actuator, an upper frame, an upper mold, and an upper layer according to an embodiment and FIG. 12 is a rear perspective view of an actuator, an upper frame, an upper mold, and an upper layer according to an embodiment.

Referring to FIGS. 11 and 12, the upper frame 241 may be detachably connected to each of an actuator 23 and an upper cover 25, according to an embodiment. The upper frame 241 may include an upper frame body 2411, hook holes 2412, and aligning protrusions 2413.

In an embodiment, the upper frame body 2411 may be rotatably connected to a lower frame. The upper frame body 2411 may include first holes 2411*a* penetrated by first screws 2411*c* connected to the actuator 23, and a second hole 2411*b* penetrated by a second screw 2411*d* connected to the upper mold 251. At least a portion of the first screws 2411*c* may penetrate the first holes 2411*a* and be connected to the actuator 23. At least a portion of the 20 second screw 2411*d* may penetrate the second hole 2411*b* and be connected to the upper mold 251. While a user is in motion, the upper frame 241 may not be easily separated from the actuator 23 or the upper mold 251. A user may separate the first screws 2411*c* or the second screw 2411*d* from the actuator 23 or the upper mold 251, respectively, with or without a tool.

In an embodiment, the hook holes 2412 may be formed through the upper frame body 2411. A plurality of hook holes 2412 may be formed. The plurality of hook holes 2412 may be provided to be spaced apart from one another in a circumferential direction of a rotation axis of a main frame with respect to a proximal support. The hook holes 2412 may have a curved shape.

In an embodiment, the aligning protrusions 2413 may be formed to protrude from the upper frame body 2411 and be inserted into the actuator 23. A plurality of aligning protrusions 2413 may be provided to be spaced apart from one another in a circumferential direction of a rotation axis of a main frame with respect to a proximal support. The strength of the combination of the upper frame body 2411 and the actuator 23 may increase. While the plurality of aligning protrusions 2413 is inserted into the actuator 23, the upper frame 241 may cover an outer surface of the actuator 23. The upper frame body 2411 may be separated from the actuator 23 without disassembling the actuator 23.

In an embodiment, the upper mold 251 may include an upper mold body 2511 and a plurality of hooks 2512. The upper mold body 2511 may cover the upper frame body 2411. The upper mold body 2511 may include upper grooves 2511*a* which may accommodate the second screw 2411*d*. The second screw 2411*d* may be accommodated in the upper groove 2511*a* and may not penetrate the upper mold 251. The upper layer 252 connected to the upper mold 251 may be undamaged by the second screw 2411*d*.

In an embodiment, the plurality of hooks 2512 may be formed to protrude from the upper mold body 2511 and be inserted into the hook holes 2412. The strength of the combination of the upper frame 241 and the upper mold 251 may increase without using an additional engaging component. A user may separate the upper mold 251 from the upper frame 241 after removing the second screw 2411*d* from the upper grooves 2511*a* and separating the plurality of hooks 2512 from the hook holes 2412.

According to an embodiment, a reconfigurable motion assistance apparatus may include a waist belt worn around a waist part of a user, a thigh belt worn around a thigh part of the user, an actuator connected, directly or indirectly, to the waist belt and configured to generate power, a main frame including an upper frame connected, directly or indirectly, to the actuator and a lower frame connected, directly or indirectly, to the upper frame and configured to transmit the power to the thigh belt, an upper cover provided to be detachable from the upper frame, and a lower cover provided to be detachable from the lower frame.

In an embodiment, the reconfigurable motion assistance apparatus may further include a link rotatably connected, directly or indirectly, to at least one frame of the upper frame and the lower frame.

In an embodiment, the upper frame and the lower frame may be spaced apart from each other.

In an embodiment, the reconfigurable motion assistance apparatus may further include a rotating shaft configured to connect at least one of the upper frame and the lower frame to the link.

In an embodiment, the upper frame may include an upper frame body rotatably connected, directly or indirectly, to the lower frame and a plurality of hook holes formed through the upper frame body, and the upper cover may include an upper cover body covering the upper frame body and a plurality of hooks formed to protrude from the upper cover body and insertable into the plurality of hook holes.

In an embodiment, the plurality of hook holes may be provided to be spaced apart from one another around a rotation axis of the main frame, in a circumferential direction, with respect to the waist belt.

In an embodiment, the upper frame may further include a plurality of aligning protrusions formed to protrude from the upper frame body and inserted into the actuator.

In an embodiment, the lower frame may include a lower frame body connected, directly or indirectly, to the upper frame body, a frame rib formed to protrude from the lower frame body and configured to support the lower cover, and a holder detachably connected, directly or indirectly, to the thigh belt.

In an embodiment, the frame rib may include a core rib provided between at least the link and the holder, a lower rib formed to extend from the core rib to the holder, and an upper rib formed on an opposite side of the lower rib based on the core rib.

In an embodiment, the frame rib may further include a side rib formed to extend from an edge of the lower frame body and connectable to the lower rib or the upper rib.

In an embodiment, the reconfigurable motion assistance apparatus may further include a connector including a connector body connected, directly or indirectly, to the thigh belt and a pair of connector wings formed to extend from the connector body, wherein the connector may be provided to be detachable from the holder.

In an embodiment, the holder may include a pair of connector guides configured to guide a rotation of the connector, a holder body facing the connector body and provided between at least the pair of connector guides, and a pair of supporters formed to extend from the holder body and configured to respectively support the pair of connector wings, and the connector may be configured to rotate in one direction with respect to the holder, in a state in which the pair of connector wings is supported by the pair of connector guides, so that the connector may be connected, directly or indirectly, to the holder.

In an embodiment, one of the pair of connector wings may be supported by one of the pair of supporters in a state in which the connector wing is spaced apart from one of the pair of connector guides.

In an embodiment, the lower cover may include a lower cover body covering the lower frame body and cover protrusions formed to protrude from the lower cover body and inserted between the one of the pair of connector wings and the one of the pair of connector guides.

Each embodiment herein may be used in combination with any other embodiment(s) described herein.

According to an embodiment, a reconfigurable motion assistance apparatus may include a proximal support configured to support a proximal part of a user, a distal support configured to support a distal part of the user, an actuator connected, directly or indirectly, to the proximal support and configured to generate power (e.g., torque), a main frame including an upper frame provided to be detachable from the actuator and a lower frame rotatably connected, directly or indirectly, to the upper frame and connected, directly or indirectly, to the distal support, an upper mold provided to be detachable from the upper frame, an upper cover including an upper layer covering the upper mold, a lower mold provided to be detachable from the lower frame and is spaced apart from the upper mold, and a lower cover including a lower layer covering the lower mold.

The reconfigurable motion assistance apparatus may further include a link rotatably connected, directly or indirectly, to at least one frame of the upper frame and the lower frame.

The upper frame and the lower frame may be spaced apart from each other.

The reconfigurable motion assistance apparatus may further include a rotating shaft connecting the at least one frame with the link.

The upper frame may include an upper frame body rotatably connected, directly or indirectly, to the lower frame and a plurality of hook holes formed through the upper frame body.

The upper mold may include an upper mold body covering the upper frame body and a plurality of hooks formed to protrude from the upper mold body and insertable into the plurality of hook holes.

The plurality of hook holes may be provided to be spaced apart from one another around a rotation axis of the main frame, in a circumferential direction, with respect to the proximal support.

Features of the embodiments described above may be combined unless clearly technically impossible.

While this disclosure includes specific embodiments, it will be apparent to one of ordinary skill in the art that various changes in form and details may be made in these embodiments without departing from the spirit and scope of the claims and their equivalents. The example embodiments described herein are to be considered in a descriptive sense only, and not for purposes of limitation. Descriptions of features or aspects in each embodiment are to be considered as being applicable to similar features or aspects in other embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A motion assistance apparatus comprising:
   a waist member, comprising a support, configured to be worn by a user proximate a waist of the user;
   a thigh belt configured to be worn around a thigh part of the user;
   an actuator configured to generate power;
   a main frame comprising an upper frame connected to the actuator and a lower frame connected to the upper frame and connected to the actuator and to the thigh belt, wherein operation of the actuator causes movement of the main frame to cause movement of the thigh belt relative to the waist member;
   an upper cover for covering at least part of the upper frame and configured to be detachable from the upper frame; and
   a lower cover for covering at least part of the lower frame and configured to be detachable from the lower frame, wherein:
   the upper frame comprises an upper frame body and a plurality of hook holes formed through the upper frame body, and
   the upper cover comprises an upper cover body covering the upper frame body and a plurality of hooks formed to protrude from the upper cover body and insertable into the plurality of hook holes.

2. The motion assistance apparatus of claim 1, further comprising a link rotatably connected to at least one of the upper frame and the lower frame.

3. The motion assistance apparatus of claim 2, wherein the upper frame and the lower frame are spaced apart from each other.

4. The motion assistance apparatus of claim 3, further comprising a rotating shaft configured to connect the link to at least one of the upper frame and the lower frame.

5. The motion assistance apparatus of claim 2, wherein the upper frame body is rotatably connected to the lower frame.

6. The motion assistance apparatus of claim 1, wherein the plurality of hook holes are configured to be spaced apart from one another around a rotation axis of the main frame, in a circumferential direction, with respect to the waist member.

7. The motion assistance apparatus of claim 1, wherein the upper frame comprises a plurality of aligning protrusions protruding from the upper frame body and inserted into the actuator.

8. The motion assistance apparatus of claim 1, wherein the lower frame comprises:
   a lower frame body connected to the upper frame body;
   a frame rib protruding from the lower frame body and configured to support the lower cover; and
   a holder detachably connected to the thigh belt.

9. The motion assistance apparatus of claim 8, wherein the frame rib comprises:
   a core rib provided between at least the link and the holder;
   a lower rib extending from the core rib to the holder; and
   an upper rib on an opposite side of the lower rib based on the core rib.

10. The motion assistance apparatus of claim 9, wherein the frame rib further comprises a side rib formed to extend from an edge of the lower frame body and connectable to the lower rib and/or the upper rib.

11. The motion assistance apparatus of claim 8, further comprising a connector comprising a connector body connected to the thigh belt and a pair of connector wings extending from the connector body, wherein the connector is configured to be detachable from the holder.

12. The motion assistance apparatus of claim 11, wherein the holder comprises:
   a pair of connector guides configured to guide a rotation of the connector;
   a holder body facing the connector body and provided between at least the pair of connector guides; and
   a pair of supporters formed to extend from the holder body and configured to respectively support the pair of connector wings, and
   wherein the connector is configured to rotate in a direction with respect to the holder, in a state in which the pair of connector wings is supported by the pair of connector guides, so that the connector is connected to the holder.

13. The motion assistance apparatus of claim 12, wherein one of the pair of connector wings is supported by one of the pair of supporters in a state in which the connector wing is spaced apart from one of the pair of connector guides.

14. The motion assistance apparatus of claim 13, wherein the lower cover comprises:
   a lower cover body covering the lower frame body; and
   cover protrusions formed protruding from the lower cover body and inserted between at least the one of the pair of connector wings and the one of the pair of connector guides.

15. A motion assistance apparatus comprising:
   a waist member, comprising a support, configured to be worn by a user proximate a waist of the user;
   a thigh belt configured to be worn around a thigh part of the user;
   an actuator configured to generate power;
   a main frame comprising an upper frame connected to the actuator and a lower frame connected to the upper frame and connected to the actuator and to the thigh belt, wherein operation of the actuator causes movement of the main frame to cause movement of the thigh belt relative to the waist member;
   an upper cover for covering at least part of the upper frame, and comprising an upper mold configured to be detachable from the upper frame and an upper layer covering the upper mold; and
   a lower cover for covering at least part of the lower frame, and comprising a lower mold configured to be detachable from the lower frame and is spaced apart from the upper mold and a lower layer covering the lower mold,
   wherein the upper mold comprises an upper mold body covering the upper frame body and a plurality of hooks formed to protrude from the upper mold body and insertable into a plurality of hook holes formed through the upper frame body.

16. The motion assistance apparatus of claim 15, wherein the upper frame and the lower frame are spaced apart from each other.

17. The motion assistance apparatus of claim 15, further comprising a link rotatably connected to at least one of the upper frame and the lower frame.

18. The motion assistance apparatus of claim 17, further comprising a rotating shaft configured to connect the link to at least one of the upper frame and the lower frame.

19. The motion assistance apparatus of claim 15, wherein the upper frame comprises an upper frame body rotatably connected to the lower frame.

20. The motion assistance apparatus of claim 19, wherein the plurality of hook holes are configured to be spaced apart from one another around a rotation axis of the main frame with respect to the waist member in a circumferential direction.

* * * * *